Patented Dec. 14, 1926.

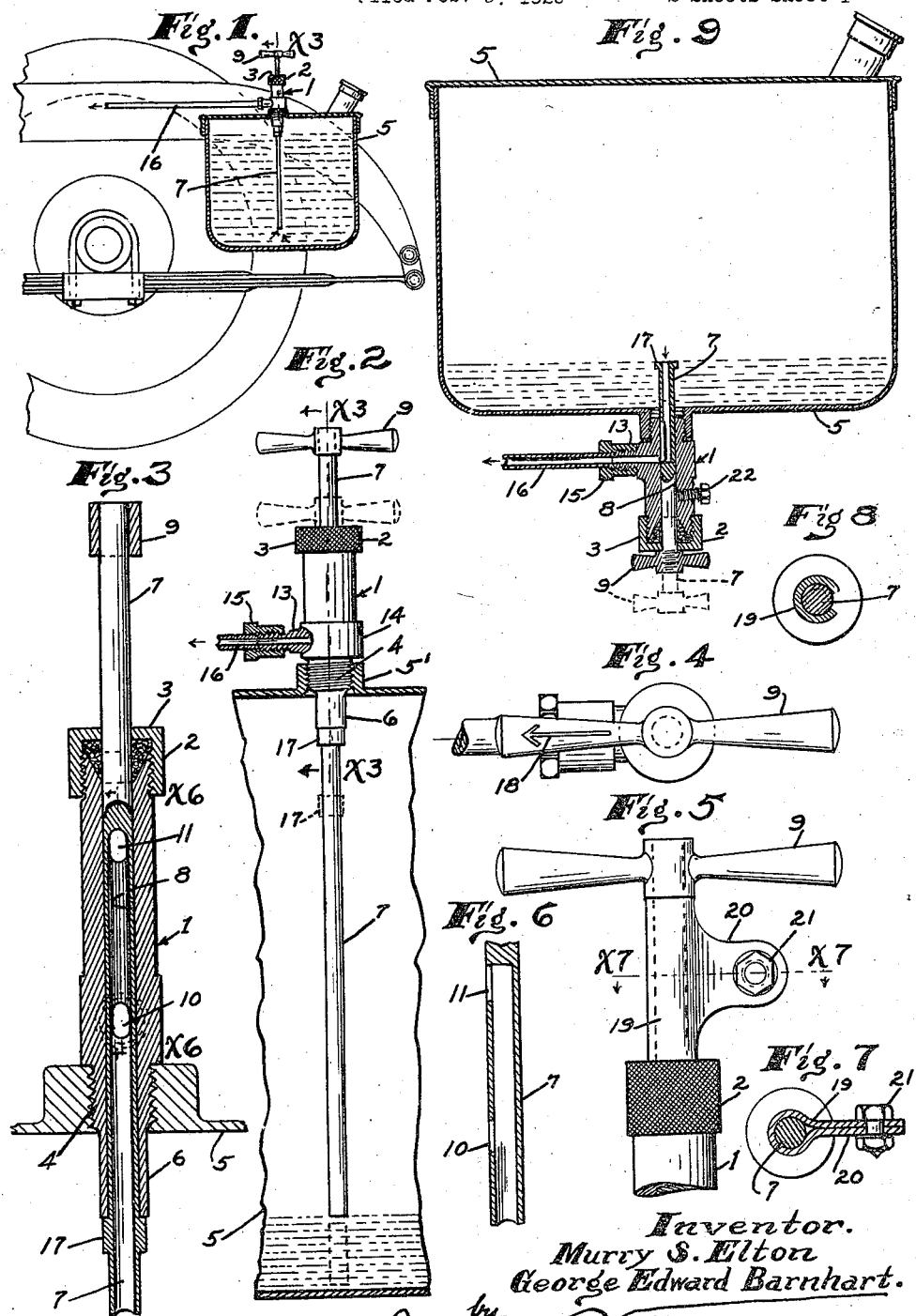

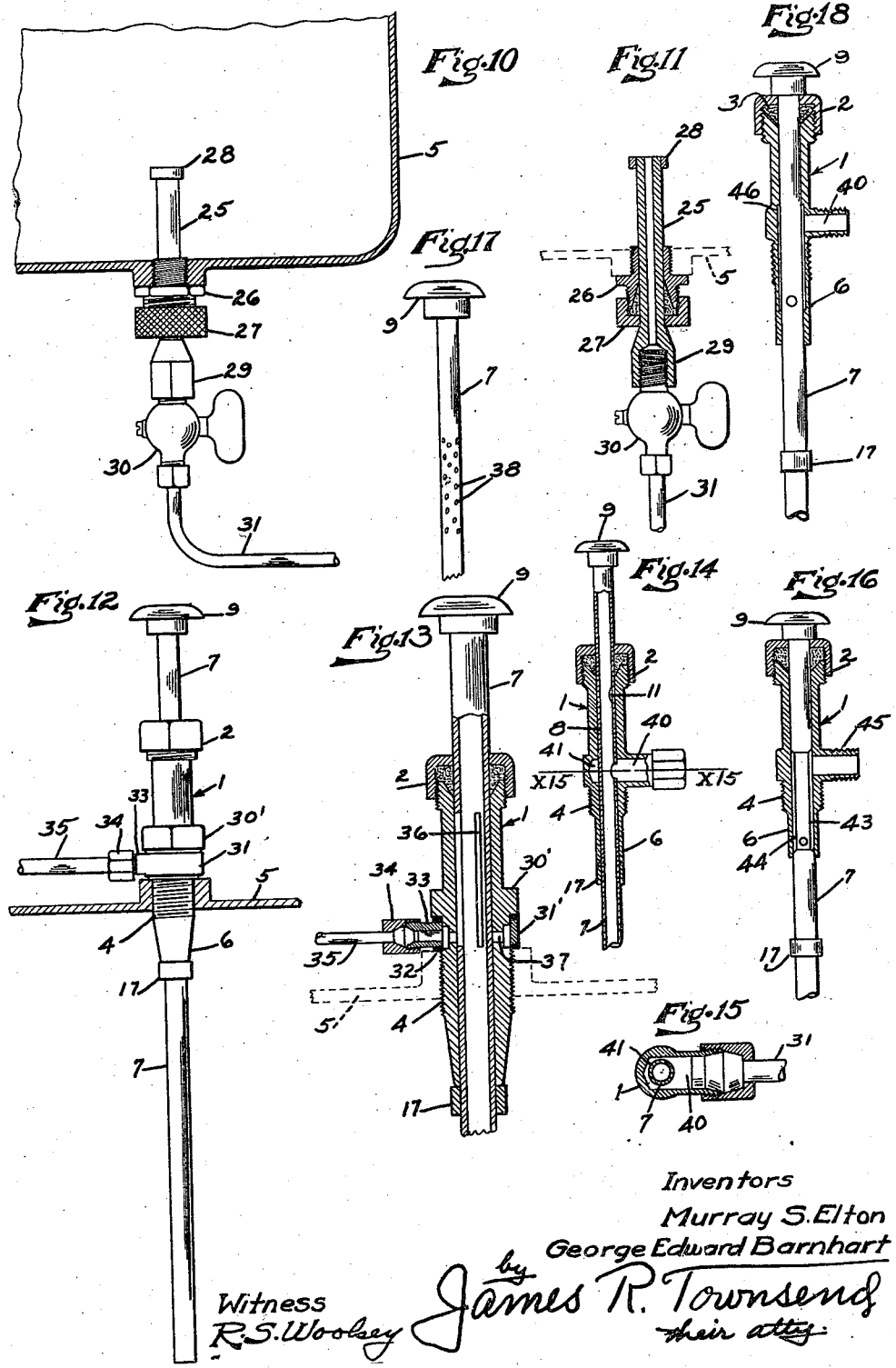

1,610,365

UNITED STATES PATENT OFFICE.

MURRAY S. ELTON AND GEORGE EDWARD BARNHART, OF PASADENA, CALIFORNIA; SAID BARNHART ASSIGNOR TO SAID ELTON.

MEANS FOR MAINTAINING A RESERVE IN FUEL TANKS.

Application filed February 3, 1925. Serial No. 6,582.

Our invention relates to an improved adjustable liquid outlet or intake comprising a tube which extends into a tank containing liquid.

An object of our invention is to provide novel means adapted to be inserted in a tank whereby the amount of liquid withdrawn therefrom may be predetermined by the operator or attendant.

Our invention is particularly applicable to fuel tanks now commonly used on motor vehicles, and in this adaptation our invention is particularly useful in providing an emergency supply of fuel. That is, the means inserted in the fuel tank may be so adjusted that no fuel will be withdrawn therefrom after the fuel has been lowered to a predetermined height, and there will still remain a sufficient quantity of fuel in the tank that is available after such means are further adjusted to obtain the same.

A feature of our invention is the provision of an adjustable outlet which is mounted in a fuel tank, and which in one position does not extend to the bottom of said tank, thus leaving a supply of fuel which may be drawn upon by adjusting the outlet to immerse it in such remaining fuel.

An object is to provide novel outlet means for auto fuel tanks whereby an emergency supply of fuel may be caused to remain in said tank, thus eliminating the necessity of a specially constructed tank with a storage reservoir therein, or a separate reservoir to obtain such emergency supply.

A further object is to provide a novel outlet for the majority of tanks now in use, and which may be mounted in such tanks, without disturbing its construction and without providing new holes therein. In the majority of cases our novel outlet is adapted to fit into and is secured in the usual orifices provided for fuel outlets.

An object of our invention is to provide a novel outlet for tanks that will obtain the above objects and which is simple in construction, inexpensive to manufacture, and which may be installed with a minimum amount of labor.

Our novel outlet for tanks provides the usual inlet or intake of the fuel supply system for automobiles and in this sense our device may be termed either an outlet for tanks or an intake for the system through which the contents of the tank flows.

Other objects, advantages and features of my invention may appear from the accompanying drawings, the subjoined detailed description and the appended claim.

The accompanying drawings illustrate the invention.

Figure 1 is a side elevation partly in section of a tank outlet or fuel supply intake constructed in accordance with our invention, and mounted on a motor vehicle tank, a fragment of which is shown.

Fig. 2 is an enlarged side elevation of the intake shown in Fig. 1, parts broken away to show the interior construction.

Fig. 3 is an enlarged sectional view taken on line $x^3$, Fig. 2.

Fig. 4 is a plan view of the device shown in Figs. 1, 2 and 3.

Fig. 5 is a fragmentary side elevation of the device shown in Fig. 1.

Fig. 6 is a sectional view taken on line $x^6$, Fig. 3.

Fig. 7 is a sectional view taken on line $x^7$, Fig. 5.

Fig. 8 is a view similar to Fig. 7, showing a modified form of spacing clamps.

Fig. 9 is a longitudinal sectional view of a modified form of intake mounted in a tank.

Fig. 10 is a side elevation of another modified form of intake.

Fig. 11 is a longitudinal sectional view of the same.

Fig. 12 is a side elevation of a further modified form of intake.

Fig. 13 is an enlarged fragmentary longitudinal sectional view of the same.

Fig. 14 is a longitudinal sectional view of an intake showing a modified form of outlet therefrom.

Fig. 15 is a sectional view taken on line $x^{15}$, Fig. 14.

Fig. 16 is a longitudinal sectional view of an intake showing another modified form of outlet therefrom.

Fig. 17 is a fragmentary side elevation of a slightly modified form of intake tube.

Fig. 18 is a section analogous to Fig. 16 showing a slightly modified form of outlet therefrom.

Although we have shown our invention as applied to an automobile gas tank and for the sake of brevity will describe its functions as so applied, we do not wish to be limited to said application as it will be apparent that the invention may be applied to other containers or receptacles than auto gas tanks.

The variable tank outlet or fluid intake *a* consists of a head or main body 1, provided at one end with a packing gland 2 which is of the usual construction and comprises a nut 3 threaded onto the body 1, and adapted to force the packing about the rod or tube 7 extending therethrough. The body 1 is provided at the end opposite the gland 2 with a threaded section 4 which is adapted to be threaded into the usual nut 5' welded onto the fuel tank 5, either on the top or the bottom thereof, as will be further described. A sleeve 6 extends beyond and from the threaded section 4, the purpose of which will be further amplified.

A tube 7 extends through, and is slidable in, a longitudinal bore 8 extending through the body 1 and sleeve 6. This tube extends into the tank 5 and is open on the end within the tank, but the opposite end is closed and a handle 9 is secured thereto. A pair of spaced holes 10 and 11 arranged one above the other extend through the tube 7 from the bore of the tube, and are adapted to be selectively brought into alinement with an outlet duct 13. This duct extends through a boss 14 which is formed on the body 1 adjacent the section 4, and the boss is provided with a threaded extension upon which a nut 15 is threaded to hold the outlet pipe 16 in alinement with the duct.

A stop ring 17 is formed or secured on the tube 7, and is adapted to limit the upward movement of said tube by engaging the sleeve 6. The ring is so spaced on the tube that when it engages the sleeve 6 the hole 10 will be in alinement with the outlet duct 13. The handle 9 is also spaced above the top of the body 1, i. e., above the gland 2; a distance equal to the space between the two holes 10 and 11. Thus it will be seen that with the handle 9 raised above the body 1 and the ring 17 engaging the sleeve 6 the hole 10 registers with the duct 13, and the fluid is drawn by the usual vacuum means, not shown, through the tube 7, hole 10, duct 13 into the outlet pipe 16 and may be withdrawn from the tank until the level of the fluid reaches the height predetermined by the distance the end of the tube 7 is inserted into the tank. When the handle 9 is moved downwardly until it engages the top of the body 1 the hole 11 registers with the duct 13 to permit the tank to be practically entirely emptied of fluid.

In Figs. 1 to 3 inclusive the body is threaded into the top of the tank 5 and the tube 7 extends downwardly into the fluid. This construction is applicable for use in connection with a pump, vacuum tank, etc. The tube 7 is of such a length that with the handle 9 in the raised position the bottom of said tube does not extend to the bottom of the tank. The fluid supply is all drawn from the bottom of the tube 7, consequently by this construction a surplus or emergency supply is provided in the bottom of the tank when the tube is raised.

This surplus supply may be drawn upon by the operator or attendant moving the handle 9 and consequently the tube 7 downwardly as shown in dotted lines in Fig. 2, this immerses the end of said tube in the remaining liquid. The outlet of the fuel is then through the tube 7 and hole 11 as previously described.

In construction shown in Fig. 9 we have shown our invention applied to a tank from which the fluid is drawn by gravity.

In such construction the body 1 threads into the bottom of the tank 5 and the tube 7 extends upwardly into the fluid. When the handle 9 is against the bottom of the body 1 the end of the tube 7 is above the bottom of the tank, thus providing an emergency supply. By lowering the tube 7 and handle 9, as shown in dotted lines Fig. 9, the end of the tube is brought to the bottom of the tank and the tank may then be completely emptied.

The sleeve 6 in Figs. 1–3 serves to cover the hole 10 in the lowered position of the tube 7 so that the fluid must be drawn through the bottom of the tube. By rotating the handle 9 thus moving the holes 10 or 11 out of registry with the outlet, the fluid supply may be stopped. An arrow 18 on the handle 9 as shown in Fig. 4, indicates the open position.

To prevent the accidental displacement of the tube 7 from the raised to the lowered position when applied to the top of a tank we provide a clip 19, which encircles the tube 7 between the handle 9 and the top of the body 1. This clip may have a pair of lugs 20 thereon through which a bolt 21 extends to securely fix the same on the tube 7 or such clip may be as shown in Fig. 8.

This clip must be removed before the tube 7 may be moved. In Fig. 9 we have shown a set screw 22 extending through the body 1 against the tube 7 thus holding said tube in position.

In the modified form shown in Figs. 10 and 11 a type of outlet or intake extending through the bottom of the tank 5 is shown. A tube 25 extends through a hollow nut 26 threaded into the tank 5 and through a packing gland 27 on the bottom of said nut.

A ring 28 on the upper end of the tube 25 is adapted to engage the nut 26 to limit the downward movement of the tube. The lower end of the tube 25 is enlarged as at 29, and internally threaded to receive a valve 30 from which valve a flexible pipe 31 extends. This construction is very inexpensive, and easy to install.

Regulation of the supply is accomplished by moving the tube 25 and valve 30 upwardly or downwardly, the pipe 31 bending sufficiently to accomplish this. The gland 27 is drawn tight enough to prevent accidental displacement of the tube 25.

In Figs. 12 to 18 inclusive we have shown slightly modified forms of the type of tank outlet extending into the top of the tank. The construction in said figures is identical in so far as the body 1, gland 2, section 4, tube 7, ring 17 are concerned. The body 1 in Figs. 12 and 13 is provided with a nut section 30' spaced from the threads 4.

An annular ring 31' is positioned between the nut section 30' and the top of the tank 5 and is spaced slightly from said body providing an annular space 32. The ring 31' is formed with a threaded outlet boss 33 on which the nut 34 is threaded holding the outlet pipe 35 in position thereon. The ring 31' is securely held between the nut 30' and the top of the tank 5, suitable washers are placed on the top and bottom of the ring to prevent leakage. This construction permits the outlet to be set at any desired angle relative to the axis of the tube 7.

Slots 36 are formed in the tube 7 throughout the length of travel of said tube, and these communicate with ports 37 in the body 1, which ports extend to the space 32 thus providing an outlet for the fluid. If desired the tube 7 may be perforated as shown at 38 in Fig. 17.

In Figs. 14 to 16 and 18 inclusive slightly modified forms of outlets are shown. These outlets are arranged so that no stoppage will occur if the tube 7 should be rotated.

In Figs. 14 and 15 an outlet duct 40 extends into the body 1 and across the bore 8 therein. This duct is of greater diameter than the bore 8 or tube 7, and consequently an annular outlet space 41 is provided around the tube 7.

In Fig. 16 the tube 7 is constricted for the distance of travel of said tube, as shown at 43, thus providing an annular outlet space 44 about the tube into which space the outlet duct 45 extends.

In Fig. 18 the bore 8 is slightly enlarged as at 46 to provide an annular clearance or space around the tube 7 thereby forming another slightly modified construction of outlet.

The operation of the device is sufficiently clear from the foregoing description.

We claim:

In a tank, an adjustable intake comprising a body, means to secure said body to the tank, a tube extending through said body into said tank, a pipe extending from said body, said tube having outlet ports therein adapted to register with said pipe, said tube being slidable in said body to selectively register said port with said pipe, a handle on said tube, a clip around said tube and extending from said body to said handle to hold the tube elevated, said clip being formed with a pair of lugs, and means extending through said lugs to hold said clip in clamped position.

In testimony whereof, we have hereunto set our hands at Los Angeles, California, this 26th day of January 1925.

MURRAY S. ELTON.
GEORGE EDWARD BARNHART.